(12) United States Patent
Dube et al.

(10) Patent No.: US 9,164,814 B2
(45) Date of Patent: *Oct. 20, 2015

(54) ACCELERATION PREDICTION IN HYBRID SYSTEMS

(71) Applicant: International Business Machines Corporation, Armonk, NY (US)

(72) Inventors: Parijat Dube, Hicksville, NY (US); Xiaoqiao Meng, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/059,624

(22) Filed: Oct. 22, 2013

(65) Prior Publication Data
US 2015/0100972 A1 Apr. 9, 2015

Related U.S. Application Data

(63) Continuation of application No. 14/045,292, filed on Oct. 3, 2013.

(51) Int. Cl.
*G06F 9/54* (2006.01)
*G06F 9/445* (2006.01)

(52) U.S. Cl.
CPC *G06F 9/54* (2013.01); *G06F 9/445* (2013.01); *G06F 2009/44531* (2013.01)

(58) Field of Classification Search
CPC .. G06F 9/54; G06F 9/445; G06F 2009/44531
See application file for complete search history.

(56) References Cited

U.S. PATENT DOCUMENTS 8,046,565 B2 10/2011 Yasukawa
2005/0240935 A1* 10/2005 Ramanathan ................. 718/105

(Continued)

FOREIGN PATENT DOCUMENTS

JP 2011108140 6/2011

OTHER PUBLICATIONS

Drahzal et al., System Level Accelerators: A Hybrid Computing Solution, IBM Corporation, Apr. 2008, pp. 1-19, ibm.com/redbooks/redp4409.

(Continued)

*Primary Examiner* — H S Sough
*Assistant Examiner* — Syed Roni
(74) *Attorney, Agent, or Firm* — Scully, Scott, Murphy & Presser, P.C.; Nidhi Garg, Esq.

(57) ABSTRACT

Predicting acceleration in a hybrid system may comprise determining a number of cross system calls in a first host-accelerator computer architecture running a workload. Host machine overhead and accelerator overhead in the first host-accelerator computer architecture associated with each of the cross system calls may be determined. Communication delay associated with each of the cross system calls in the first host-accelerator computer architecture running a workload may be determined. An application response time may be predicted for a candidate application to be run in a second host-accelerator computer architecture, based at least on the determined host machine overhead, the accelerator overhead, and the communication delay associated with each of the cross system calls in the first host-accelerator computer architecture running a workload.

11 Claims, 9 Drawing Sheets

(56) References Cited

U.S. PATENT DOCUMENTS

| | | | |
|---|---|---|---|
| 2006/0271544 A1* | 11/2006 | Devarakonda et al. ........... 707/9 |
| 2008/0235364 A1 | 9/2008 | Gorbatov et al. |
| 2010/0169892 A1 | 7/2010 | Stam et al. |
| 2011/0173155 A1* | 7/2011 | Becchi et al. ................ 707/610 |
| 2012/0081373 A1* | 4/2012 | Li et al. .......................... 345/520 |
| 2014/0240327 A1* | 8/2014 | Lustig et al. ................. 345/505 |

OTHER PUBLICATIONS

Anonymous, Workload Optimization through Dynamic Reconfiguration of Compute Nodes, Feb. 26, 2012, pp. 1-3, http://priorartdatabase.com/IPCOM/000215416.

Anonymous, A method and system to predict performance gains by applying a hardware accelerator through hardware sample data analysis; Jun. 7, 2010, pp. 1-4, http://priorartdatabase.com/IPCOM000196570.

Clemens, Future of Computer Hardware, IET 8th International Conference on Computation in Electromagnetics (CEM 2011), Jan. 2011, p. 159.

Liu et al., AMBIENCE: Automatic Model Building using InferENCE, in Congress MSR03, Metz, France, Oct. 2003, pp. 1-18.

Zhang et al., Workload Service Requirements Analysis: A Queueing Network Optimization Approach, Modeling, Analysis and Simulation of Computer and Telecommunications Systems, 2002. MASCOTS 2002. Proceedings. 10th IEEE International Symposium on, pp. 23-32.

Dube et al., A Tool for Scalable Profiling and Tracing of Java and Native Code Interactions, Proceeding QEST '11 Proceedings of the 2011 Eighth International Conference on Quantitative Evaluation of SysTems, pp. 37-46.

* cited by examiner

HOST-ONLY MODE (H-MODE)
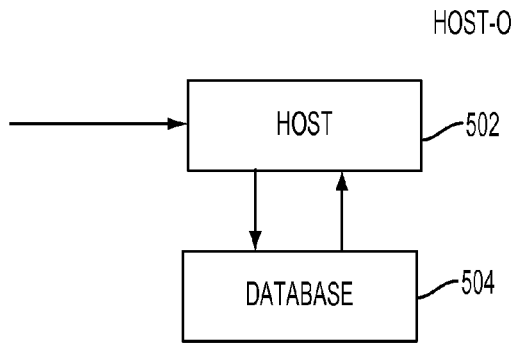
FIG. 5A
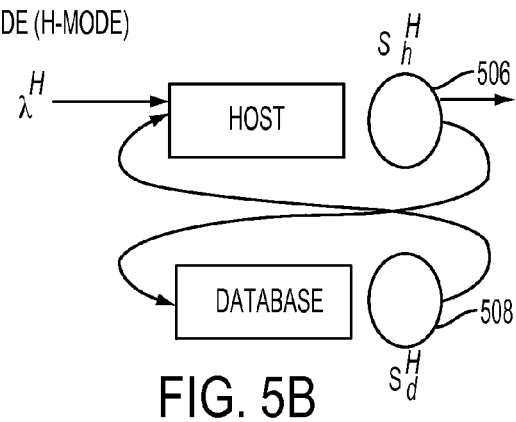
FIG. 5B
$$R^H = R_h^H + R_d^H + \delta_{h\text{-}d}$$
FIG. 5C
$$R^H = \frac{S_h^H}{1 - \rho_h^H} + \frac{S_d^H}{1 - \rho_d^H} + \delta_{h\text{-}d}^H$$
FIG. 5D
$$T^H = \text{MIN}\left(\frac{C_h}{S_h^H}, \frac{C_d}{S_d^H}\right)$$
FIG. 5E HOST-ACCELERATOR MODE (HA-MODE)
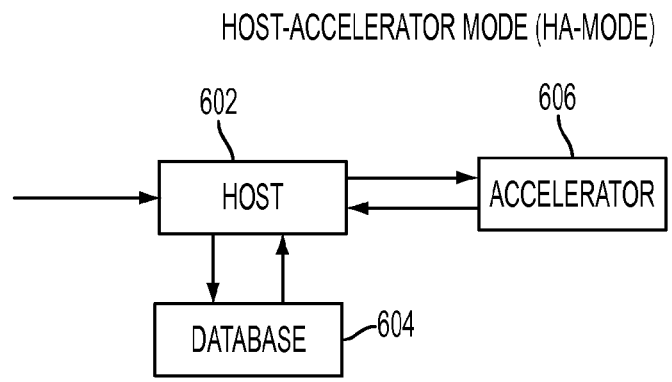
FIG. 6A
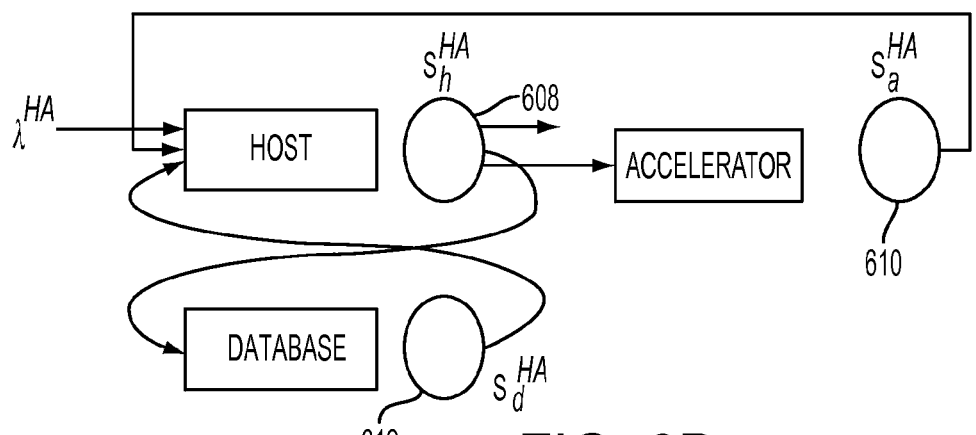
FIG. 6B
$$R^H = R_h^{HA} + R_d^{HA} + R_a^{HA} + \delta_{h-d}^{HA} + \delta_{h-a}^{HA}$$
$$= \frac{S_h^{HA}}{1 - \rho_h^{HA}} + \frac{S_d^{HA}}{1 - \rho_d^{HA}} + \frac{S_a^{HA}}{1 - \rho_a^{HA}} + \delta_{h-d}^{HA} + \delta_{h-a}^{HA}$$
FIG. 6C
$$T^{HA} = \text{MIN}\left(\frac{C_h}{S_h^{HA}}, \frac{C_d}{S_d^{HA}}, \frac{C_a}{S_a^{HA}}\right)$$
FIG. 6D

ACCELERATION PREDICTION IN HYBRID SYSTEMS

CROSS-REFERENCE TO RELATED APPLICATIONS

This application is a continuation of U.S. Ser. No. 14/045,292, filed on Oct. 3, 2013, the entire content and disclosure of which is incorporated herein by reference.

FIELD

The present application relates generally to computer architecture and more particularly to predicting benefit from implementing an accelerator in a computing environment.

BACKGROUND

Hybrid systems are composed of different software and hardware system elements which together create the operational environment for the workloads. A hybrid system may include a main processor that is a general-purpose processing unit and one or more special hardware processing units that provide increase in computational power (referred to as accelerators). To exploit full potentials of hybrid systems one needs to appropriately run the workload on one or more of system elements within the hybrid system so as to optimize the overall performance. For example, compute intensive sections of a workload running on a processing power constrained system can potentially be offloaded to a multicore system thereby scaling the throughput. An example of hybrid system is the zBLC, where a z/OS machine is attached through network connections to multicore p or x machines.

The performance improvement achievable in hybrid systems is workload specific. Depending upon the particular software functions being offloaded to accelerator, different workloads may achieve different speedups. Since migration to hybrid systems involves cost and resources, customers need to fully appreciate the tradeoffs when switching from host-only to host-accelerator system. This will help them do a cost-benefit analysis of migrating their workloads to a hybrid system.

Workload migration between host and accelerator involves additional processor cycle consumption on the host as host needs to make a call to the accelerator and transfer the execution control. This may require making a RPC (Remote Procedure Call) or using another communication protocol. There is also a communication overhead as typically the accelerator and the host are connected through communication links like local area network (LAN), remote direct memory access (RDMA) or Peripheral Component Interconnect Express (PCIe). When studying workload performance with hybrid system these additional costs need to be accounted.

However, there is no known solution to predict end-to-end acceleration potential of workloads in hybrid environments. While some work has been done around static code analysis to quantify the fraction of code that can benefit from acceleration, those works are specific to workloads and fail to predict end-to-end application performance in hybrid environment. They also do not account for communication and network overhead associated with co-execution of workload on heterogeneous systems when predicting acceleration benefits.

BRIEF SUMMARY

A method for predicting acceleration in a hybrid system, in one aspect, may comprise determining a number of cross system calls in a first host-accelerator computer architecture running a workload. The method may also comprise determining host machine overhead and accelerator overhead in the first host-accelerator computer architecture associated with each of the cross system calls. The method may further comprise determining communication delay associated with each of the cross system calls in the first host-accelerator computer architecture running a workload. The method may also comprise predicting an application response time for a candidate application to be run in a second host-accelerator computer architecture, based at least on the determined host machine overhead, the accelerator overhead, and the communication delay associated with each of the cross system calls in the first host-accelerator computer architecture running a workload.

A system for predicting acceleration in a hybrid system, in one aspect, may comprise a model building module operable to execute on a hardware processor and further operable to determine a number of cross system calls in a first host-accelerator computer architecture running a workload. The model building module may be further operable to determine host machine overhead and accelerator overhead in the first host-accelerator computer architecture associated with each of the cross system calls. The model building module may be further operable to determine communication delay associated with each of the cross system calls in the first host-accelerator computer architecture running a workload. An acceleration prediction module operable to predict an application response time for a candidate application to be run in a second host-accelerator computer architecture, based at least on the determined host machine overhead, the accelerator overhead, and the communication delay associated with each of the cross system calls in the first host-accelerator computer architecture running a workload.

In another aspect, model building module may be further operable to determine host machine overhead and accelerator overhead in the first host-accelerator computer architecture associated with each of the cross system calls based on at least service time of a host machine in a first host-only computer architecture running the workload, service time of a host machine in the first host-accelerator computer architecture running the workload, service time of an accelerator in the first host-accelerator computer architecture running the workload based, and the number of cross system calls in a first host-accelerator computer architecture running a workload A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 5A shows an example of host-only mode of workload execution.

FIG. 5B shows a queuing model of host-only mode of workload execution in one embodiment of the present disclosure.

FIG. 5C shows a formula that determines an end-to-end response time of a job in host-only mode (environment) in one embodiment of the present disclosure.

FIG. 5D shows a formula that determines an end-to-end response time of a job in host-only mode represented as a queuing model in one embodiment of the present disclosure.

FIG. 5E shows a formula that determines an achievable throughput in host-only mode in one embodiment of the present disclosure.

FIG. 6A shows an example of host-accelerator mode of workload execution.

FIG. 6B shows a queuing model of host-accelerator mode of workload execution in one embodiment of the present disclosure.

FIG. 6C shows a formula that determines an end-to-end response time of a job in host-accelerator mode (environment) in one embodiment of the present disclosure.

FIG. 6D shows a formula that determines an achievable throughput in host-accelerator mode in one embodiment of the present disclosure.

DETAILED DESCRIPTION

A methodology of the present disclosure in one embodiment may predict the amount of benefit from implementing an accelerator or the like in a computing environment. An accelerator is a computing unit or a processor separate from a central processing unit (CPU) or another such processor in a computing system. Examples of an accelerator may include but are limited to a graphical processing unit (GPU) and field programmable gate arrays (FPGAs). Such accelerator or the like can perform certain types of processing faster. However, the introduction of such accelerator increases the amount of overhead on the CPU in having to transfer certain things over to the accelerator. As such, not all uses cases, or software code, benefit to the same degree, or at all, from introducing an accelerator. Currently there are known tools for determining which section of codes should be off-loaded to an accelerator based on the functions occurring in the code. However, there is no known method for determining, given some code, how much benefit will be derived from introducing an accelerator.

Figure 1A:
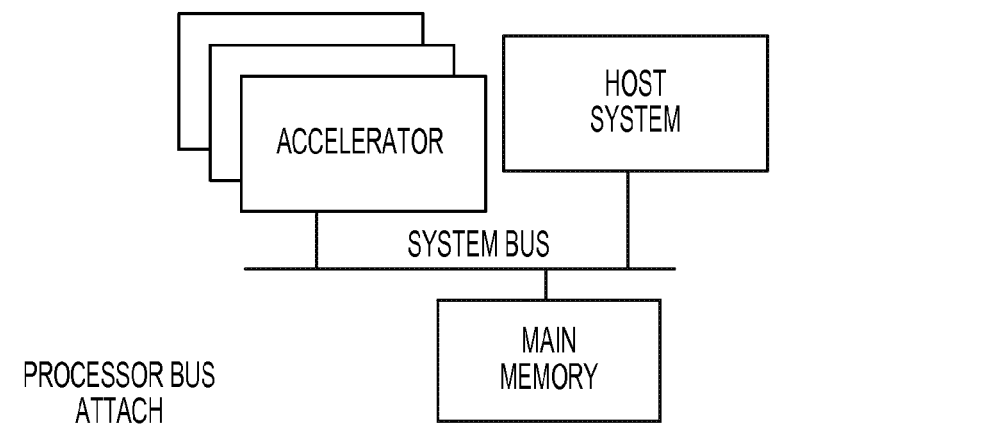
FIGS. 1A, 1B and 1C illustrate example configurations of hybrid systems and accelerators in one embodiment of the present disclosure.
Figure 1B:
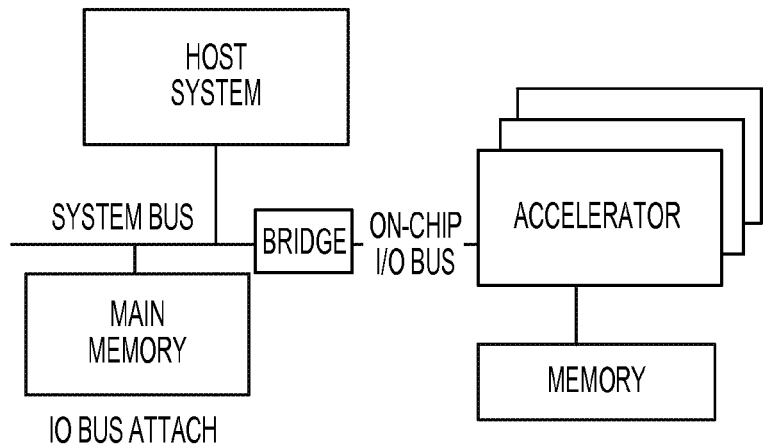
Figure 1C:
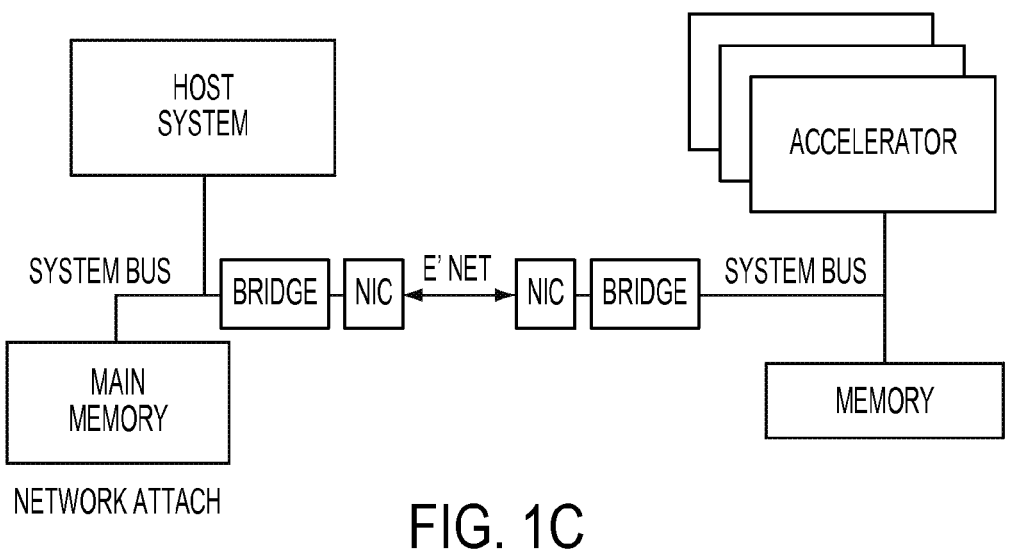

FIGS. 1A, 1B and 1C illustrate example configurations of hybrid systems and accelerators in one embodiment of the present disclosure. FIG. 1A shows one or more accelerators connected to a host system by a processor bus. FIG. 1B shows one or more accelerators connected to a host system via an input/output (I/O) bus. FIG. 1C shows one or more accelerators connected to a host system via a network such as the LAN.

A methodology of the present disclosure in one embodiment may provide for an end-to-end performance prediction in accelerator (or the like) based hybrid systems using an analytical model. A model may be first calibrated using in-house workloads and the calibrated model may be used for acceleration prediction for a new workload. A workload is considered to be all the work being processed in the system currently. A methodology of the present disclosure in one embodiment may operate in two phases. For example, first overhead associated with a off-load call is modeled for a given hybrid system (e.g., CPU+Accelerator), and second, the model is used to predict the total costs and the total gains. The difference between the total costs and the total gains is considered to be the overall benefit.

While different workloads run different applications, having different codebase, written by different developers, one can find use of common software modules across different workloads. These common modules can be functions, libraries, method calls, native calls, etc. One can then measure the overhead associated with offloading these modules for in-house workloads in hybrid systems. Then for a new workload one can identify software modules which have been profiled using existing workloads. A method and an apparatus may be provided for predictive end-to-end performance of workloads in hybrid environments.

Figure 2:
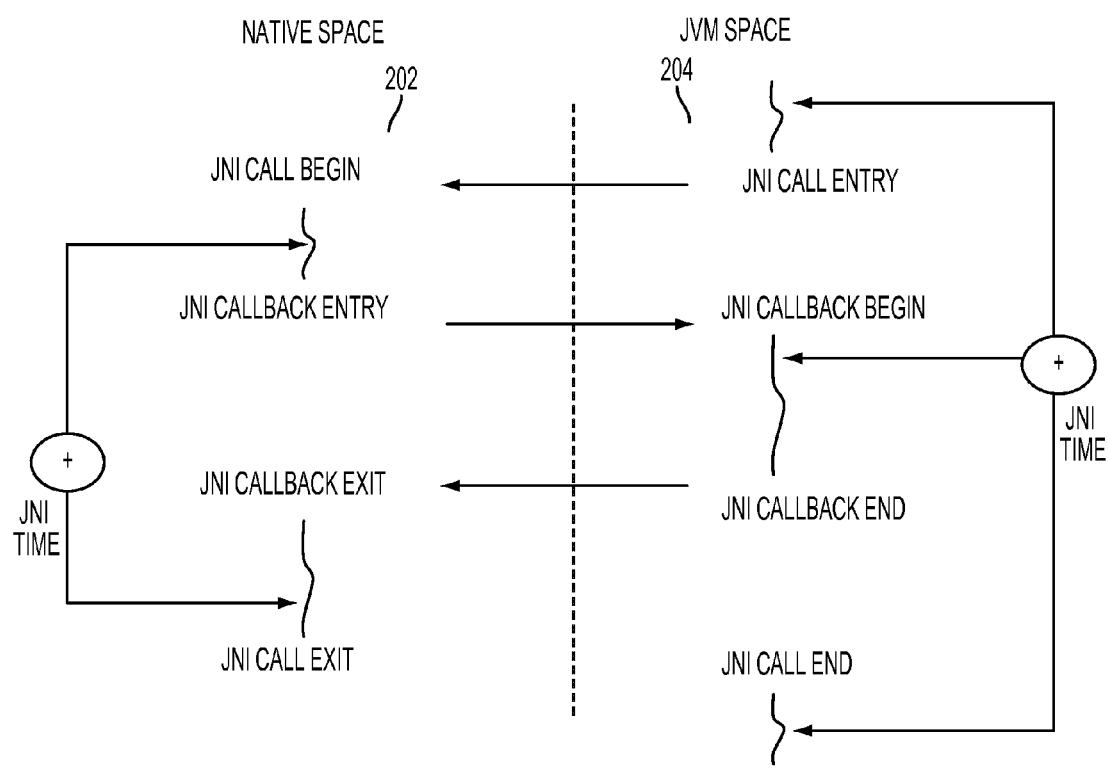
FIG. 2 shows example interactions between native and JVM space of JAVA™.

FIG. 2 shows two execution spheres of JAVA™ workload. One execution sphere is in native space 202 and the other in JAVA™ virtual machine (JVM) space 204. Java Native Interface (JNI) is the bridge between these two spheres of execution. JNI, which includes JNI calls and callbacks, enables inter-operation of JAVA™ code and libraries written in other programming languages like C/C++ and assembly. Concretely, JNI allows JAVA™ code in JVM space to call C/C++ programs in Native space and C/C++ programs in Native space to call back JAVA™ code in JVM space. JNI also provides the Invocation API, which allows native code to create a JVM and load and use JAVA™ classes. API refers to application programming interface.

Figure 3:
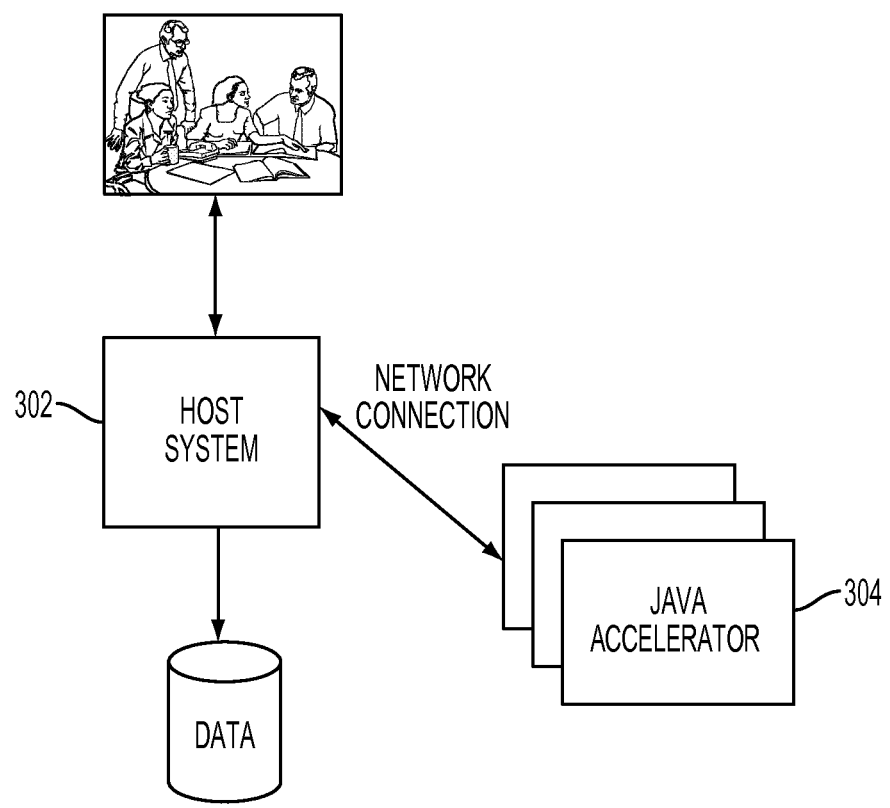
FIG. 3 shows a network attached JAVA™ accelerator as an example in one embodiment of the present disclosure.

FIG. 3 shows a network attached JAVA™ accelerator as an example in one embodiment of the present disclosure. As an example, the portion of JAVA™ workload that executes in the JVM space (e.g., FIG. 2 at 204) may be offloaded from a host system 302 to a network attached system called an accelerator system 304, for example providing network attach acceleration capacity. Such architecture may include a single system image, provide application transparency, be capable of leveraging many cores and threads for improved parallelism and throughput, be capable of incremental horizontal scale-out and be able to support single data source. For example, in one embodiment of the present disclosure, the offloading of workload portions to accelerator may be performed seamlessly without application intervention. Thus, for the application an embodiment of the present disclosure offers a single system. Workload candidates for acceleration may include intensive JAVA™ computation with few JNI services. While the entry point of the workload in the host machine and portions of workload that interact with native libraries on the host system are executed on the host system, portions of the workload executing in the JVM space can be effectively offloaded to the accelerator system to take advantage of higher processing power and hence increased throughput. The JVM may be invoked on the accelerator system by the Invocation API from the native code on the host system. However, offloading is associated with both network overhead and processing overhead. The network overhead is the delay associated with switching the workload execution between the host and the accelerator. This requires transmitting both the control information and the data. The processing overhead is associated with switching the execution from one host to an accelerator and vice-versa.

FIG. 2 shows the execution of one JNI call (with one JNI callback) within a JAVA workload. Thus, if all processing in the JVM space 204 is offloaded to the accelerator, then there are four instances of communication exchange between the host and the accelerator. The first when JNI call begins execution on the host, second when the JNI callback begins execution on the accelerator and third when the JNI callback ends on the accelerator and execution switches back to the host to finish the ongoing JNI execution. After JNI execution finishes on the host (JNI call exits) there is again a communication exchange between the host and the accelerator and the execution switches back to accelerator.

A methodology of the present disclosure in one embodiment makes use of queuing network model based abstraction of workload execution in host-only and host-accelerator environments. The models may be calibrated using experiments with in-house workloads. The methodology of the present disclosure in one embodiment may also obtain estimates of processor and communication overheads associated with different software modules. In one embodiment, a new workload is first profiled to get an estimate of processor cycles consumed by different software modules in its application code. Then, using the estimates of processor and communication overhead, the workload profile and the hybrid system model, the acceleration potential of workload is predicted. In one aspect, the methodology of the present disclosure need not be tied to any specific workloads or accelerator architecture, may be minimally invasive, accounts for processors and communication overheads (e.g., accounts for different costs associated with workload offloading such as processor and network), and predicts end-to-end performance of applications (application level performance prediction) in hybrid environments. The methodology of the present disclosure in one aspect may measure or use measurements only on existing host system.

The methodology of the present disclosure in one embodiment models a hybrid system as a queuing network with nodes representing the different servers (e.g., host, accelerator, database) and the links representing the network connections between the servers. The model is first calibrated using in-house workloads and then the calibrated model is used for acceleration prediction for new workload.

Figure 4:
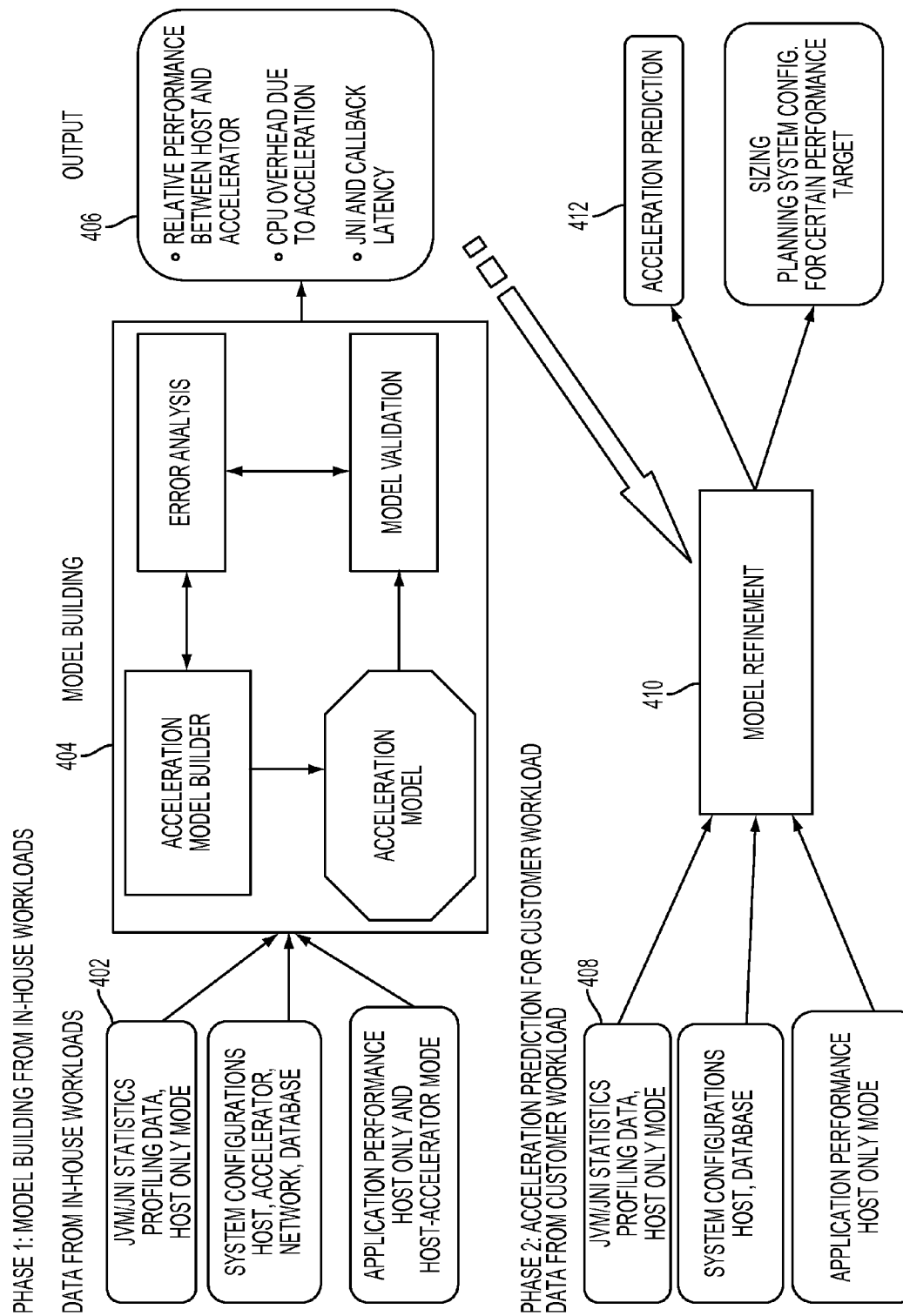
FIG. 4 is a block diagram illustrating a methodology of the present disclosure implemented in two phases in one embodiment.

An overview of the above-described methodology is presented with reference to FIG. 4 followed by details of the methodology in one embodiment using JAVA™ workload acceleration as an example. FIG. 4 is a block diagram illustrating a methodology of the present disclosure implemented in two phases in one embodiment. In phase one, one or more prediction models using in-house (or other available) workloads is built. Phase one, also referred to as a model calibration phase in the methodology of the present disclosure in one embodiment, may include measurement based determination of: service times of workload transactions at servers involved in host-only (e.g., host and database) and host-accelerator (e.g., host, accelerator and database) environments; and aggregate communication delay in host-accelerator environment. The model calibration phase may also include workload profiling that is carried out to determine the number of cross system calls and possibly their histogram distribution based on their types. Here the type includes any feature which can affect the amount of data transferred between the host and the accelerator and hence the communication delay. Once this information is available, the communication delay between host and accelerator per cross system call may be estimated. Thus, the model calibration phase may further include determining the communication delay per cross system call using the above-described measurement based determination and workload profiling. The model calibration phase may also include determining the host and accelerator central processing unit (CPU) overhead to make a cross system call using the above-described measurement based determination and workload profiling. Various available tools and techniques may be used in this phase to collect the measurement data and for estimating different parameters. After the model is calibrated it may be validated and the error propagated back to fine tune the model.

Referring to FIG. 4, workload data 402 may include JVM/JNI statistics and workload profiled data for example, collected using one or more Java™ profiling tool or the like, in host-only mode. The workload data 402 may also include system configurations such as information associated with a host, accelerator, network, and database. Examples of the configuration information may include hardware details like number of cores on different servers, number of processors and their speeds on different servers, network bandwidth and software information like threadpool size on database server, etc. The workload data 402 may also include application (workload) performance data (e.g., CPU cycles consumed, throughput, end-to-end response time) in host-only mode and host-accelerator mode.

The model building component 404 may include a model builder that utilizes the workload data 402 to build a Hybrid System Model. The Hybrid System Model is a parametric model of the host-accelerator system with the parameters of the model being inferred from the data collected on in-house workloads. The model building 404 may further include model validation and error analysis, in which the model may be validated and if any error is identified in error analysis, corrections may be made by the model builder.

The output from this model building phase may include relative performance measure between the host-only mode and the host-accelerator mode, CPU overhead incurred on the host due to running portions of an application (workload) in the host-accelerator mode, and JNI (or the like call) and callback latency.

Using the model developed in Phase one, acceleration prediction for a new workload is carried out in Phase two. Phase two, acceleration prediction phase for a new workload using the model in the methodology of the present disclosure in one embodiment, may include measurement based determination of service time of workload transactions at servers (e.g., host and database) in host-only environment or mode. This acceleration prediction phase may also include workload profiling performed to estimate a number of potential cross system calls and possibly their distribution when the workload will run in host-accelerator environment. The workload profiling also estimates an amount of host CPU cycles that can be potentially offloaded to an accelerator when the workload will run in host-accelerator environment. The acceleration prediction phase may further include using the estimated potential cross system calls for this workload from the workload profiling estimates, and communication and CPU cost per cross system call from model calibration phase (Phase one) to determine the communication and CPU cost for this workload when it will run in host-accelerator environment. The acceleration prediction phase may also include using the host service time in host-only mode for this workload computed from the above-described measurement based determination in this phase, potential CPU cycles offload estimated from the workload profiling in this phase, and communication and CPU overhead cost when offloading determined in this phase, to predict the end-to-end performance of workload in host-accelerator environment.

In Phase one, different tools/techniques can be applied to estimate the service time of workload at different levels of granularity (transaction, page, users). When only end-to-end measurements are available (e.g., LoadRunner reports) an inference based techniques may be applied, for example, as used in Zhang et al (L. Zhang, C. H. Xia, M. S. Squillante, and III Mills, W. N. Workload service requirements analysis: a queuing network optimization approach. In Modeling, Analysis and Simulation of Computer and Telecommunications Systems, 2002. MASCOTS 2002. Proceedings. 10th IEEE International Symposium on, pages 23-32, 2002). When dealing with JAVA™ workload, tools like Light Weight Tracing Tool (LWT) (see e.g., P. Dube, S. Seelam, Y. Liu, M. Ito, T. Ling, L. Fong, G. Johnson, M. Dawson, L. Zhang, and Y. Gao. A tool for scalable profiling and tracing of Java and native code interactions. In International Conference on Quantitative Evaluation of Systems (QEST), pages 37-46, 2011) can be employed to explicitly measure the CPU times consumed by the workload on different servers. Similarly, communication delay can also be known.

In Phase one, once the service times and the communication delays have been estimated for the two modes, the methodology of the present disclosure in one embodiment, next estimates the additional processing overhead on the host and the accelerator machines when operating in host-accelerator mode. This additional delay is associated with making remote calls from the host to the accelerator and vice-versa when switching the work. With JAVA™ workload, this extra processing is done for each JNI call. The methodology of the present disclosure in one embodiment first profiles the workload to get statistics on JNI calls. One approach is to assume that all JNI calls are homogeneous, and then to estimate the processing overhead per JNI call. This is a modeling assumption, as different JNI calls can have different signatures and can be associated with different data types. Once the per JNI processing overhead and communication delay for a workload are known through Phase one computation, the methodology of the present disclosure in one embodiment may use this information for predicting processing overhead and communication delay for other workload when operating in host-accelerator mode in Phase two.

Referring to FIG. 4, acceleration prediction for another workload may include obtaining or determining workload data 408 associated with that workload. In this processing, only workload data in host-only mode is obtained. Such workload data 408 may include JVM/JNI statistics and workload profiled data for example, collected as light weight tool (LWT) data, in host-only mode. The workload data 408 may also include system configurations such as information associated with host and database. The workload data 402 may also include application (workload) performance data (e.g., CPU cycles consumed, throughput) in host-only mode. Using this host-only mode workload data 408, and the output data 406 from the model building phase, the performance of this workload in host-accelerator environment is predicted as output 412. Additional output 412 from this phase may include sizing and planning of system configuration for a performance target.

In one embodiment of the present disclosure, a system environment may be modeled as a queuing network with nodes representing the different servers (e.g., host, accelerator, database) and the links representing the network connection between the servers. FIG. 5A shows an example of host-only mode of workload execution. FIG. 5B shows a queuing model of host-only mode of workload execution. In the host-only mode, the end-to-end system is modeled as a two node queuing network, with one node modeling the host 502 and the other node modeling the database 504. The host machine has a queue 506 for its work. Similarly, a database or another component may have its own queue 508 of work. The queue on the host or the database server is a result of either limited processing capacity on these nodes or due to jobs on first node waiting for some processing to be done on the second node before completion on the first node. The host and database servers can be running on the same physical machine (on different logical partitions (LPARs)) or different physical machines connected by a network link.

FIG. 5C shows a formula that determines an end-to-end response time of a job in host-only mode (environment) as the sum of the response time at the host 502 (first term in the equation in FIG. 5C), the response time at the database 504 or another such component (the second term in the equation in FIG. 5C) and the communication delay (if any) between the host and the database (the third term in the equation in FIG. 5C). FIG. 5D shows a formula that determines an end-to-end response time of a job in host-only mode represented as a queuing model (FIG. 5B) as a function of the service time (actual CPU cycles consumed at the node by the job) on the host ($S_h^H$) and the database ($S_d^H$), the processor utilization/load on those nodes ($\rho_h^H$, $\rho_d^H$) and the communication delay ($\delta_{h-d}^H$). FIG. 5E shows a formula that determines an achievable throughput in host-only mode as a function of $S_h^H$, $S_d^H$ and the number of processors on the host ($C_h$) and database ($C_d$) server.

FIG. 6A shows an example of host-accelerator mode of workload execution. FIG. 6B shows a queuing model of host-accelerator mode of workload execution. In the host-accelerator mode, the end-to-end system is modeled as a three node queuing network, with an additional node modeling the accelerator 606. In the configuration shown, the database 604 is still accessible via the host 602 and hence any database transaction initiated by the accelerator is first routed to the host from where it is sent to the database. Each node may have an associated queue for its work, queue 608 for the host server, queue 612 for the database server and queue 610 for the accelerator. The queue on any of these nodes is a result of either limited processing capacity on the node or due to jobs on the node waiting for some processing to be done on other node(s) before completion on the first node.

FIG. 6C shows a formula that determines an end-to-end response time of a job in host-accelerator mode (environment) which takes into consideration the load at the accelerator and the communication delay between the host and the accelerator in host-accelerator mode. When a node has multiple processors, the service time and the load are expressed in the formula as per processor numbers. In the formula shown in FIG. 6C, the end-to-end response time of a job in host-accelerator mode (environment) is computed as the sum of the response time at the host 602 (first term in the equation in FIG. 6C), the response time at the database 604 or another such component (the second term in the equation in FIG. 6C), the response time at the accelerator 606 (third term in the equation in FIG. 6C), the communication delay (if any) between the host and the database (the fourth term in the equation in FIG. 6C) and the communication delay (if any) between the accelerator and the database (the fifth term in the equation in FIG. 6C). FIG. 6C also shows the end-to-end response time of a job in host-accelerator mode (environment), represented as a queuing model (FIG. 6B), determined as a function of the service time (actual CPU cycles consumed at the node by the job) on the host ($S_h^{HA}$), the database ($S_d^{HA}$) and the accelerator ($S_a^{HA}$), the processor utilization/load on those nodes ($\rho_h^{HA}$, $\rho_d^{HA}$) and the communication delays ($\delta_{h-d}^{HA}$, $\delta_{h-a}^{HA}$). FIG. 6D shows a formula that determines an achievable throughput in host-accelerator mode as a function of $S_h^H$, $S_d^H$, $S_a^H$, and the number of processors on the host ($C_h$), accelerator ($C_a$) and database ($C_d$) server.

In order to predict workload performance in host-accelerator mode using FIG. 6C and FIG. 6D, a methodology of the present disclosure in one embodiment estimates the service time of workload transactions on the servers ($S_h^{HA}$, $S_a^{HA}$, $S_d^{HA}$) and the communication delays between the servers ($\delta_{h-a}^{HA}$, $\delta_{h-d}^{A}$) in HA-mode.

Let $S_h^H$ be the CPU cycles consumed by the workload in host-only mode (H-mode) on the host machine. Also let $S_h^{HA}$ and $S_a^{HA}$ be the CPU cycles in host-accelerator mode (HA-mode) on the host machine and the accelerator machine consumed by the workload. The difference of total CPU cycles consumed in the two modes gives the change in total CPU cycles consumption of application between the two modes. Each time the workload execution switches between the host to the accelerator and vice-versa, the host needs to make a Remote Procedure Call (RPC) to the accelerator and vice-versa. This consumes additional CPU cycles on both the host and the accelerator. Thus:

a. $S_h^{HA} + S_a^{HA} > S_h^H$

The difference between the total CPU cycles consumed on the host and the accelerator in HA-mode and the total CPU cycles consumed on the host in H-mode is a measure of the aggregate CPU overhead due to offloading. This is the sum of CPU overhead on the host and the accelerator and denoted by $\gamma$. The CPU overhead percentage (CPU_OHD) is the percentage of aggregate CPU cycles consumed in HA-mode that are attributed to CPU overhead due to offloading.

$$\gamma = S_h^{HA} + S_a^{HA} - S_h^H, \qquad (1)$$

$$CPU\_OHD = \left(1 - \frac{S_h^H}{S_h^{HA} + S_a^{HA}}\right) * 100.$$

Also offloading is interesting if there is an increase in workload throughput in the HA-mode. For this to happen, the CPU cycles consumed on the host in the HA-mode should be less than the CPU cycles consumed on the host in the H-mode, i.e., $S_h^{HA} < S_h^H$ An important performance metric in accelerator based systems is the percentage of saving in CPU cycles consumed by the workload in HA-mode compared to H-mode. In the present disclosure, this percentage saving defined as the CPU savings percentage (CPU_SAV):

$$CPU\_SAV = \left(1 - \frac{S_h^{HA}}{S_h^{HA}}\right) * 100.$$

Let there be I different types of cross system calls between the host and the accelerator and $n_i$ be the number of cross system calls of type i. Each cross system call of type i incurs a two-way communication delay of $\Delta_i$ and a CPU overhead of $\alpha_i$ on the host and $\beta_i$ on the accelerator. Then the aggregate communication delay between the host and the accelerator in HA-mode can be written as $$\delta_{h-a}^{HA} = \sum_i n_i \Delta_i.$$

Similarly, the aggregate CPU overhead in HA-mode can be written as A+B, where A $$\left(= \sum_i n_i \alpha_i\right)$$

and $$B\left(= \sum_i n_i \beta_i\right)$$

are the aggregate CPU overhead on the host and the accelerator respectively in HA-mode. Since $\gamma$ as defined in Equation (1) denotes the aggregate CPU overhead in HA-mode $$\gamma = A + B = \sum_i n_i(\alpha_i + \beta_i). \qquad (2)$$

Let OP be the fraction of CPU cycles in H-mode that can be offloaded in HA-mode. Since there is also CPU overhead on both the host and the accelerator in HA-mode, the service time in HA-mode on the host is equal to the sum of the CPU cycles in H-mode that will not be offloaded to accelerator in HA-mode and the CPU overhead on the host in HA-mode. Similarly, the service time in HA-mode on the accelerator is equal to the sum of the CPU cycles in H-mode that will be offloaded to the accelerator in HA-mode and the CPU overhead on the accelerator in HA-mode. Thus we can write:

$$S_h^{HA} = \left(1 - \frac{OP}{100}\right) * S_h^H + A, \qquad (3)$$

$$S_a^{HA} = \frac{OP}{100} * S_h^H + B.$$

To estimate $\delta_{h-a}^{HA}$, A, B, apart from frequency of different cross system calls we also need for each cross system call i, communication delay $\Delta_i$ and CPU overheads on the host $\alpha_i$ and accelerator $\beta_i$.

In one embodiment of the present disclosure, the following observations may be considered. Communication delay between host a machine and an accelerator is considered to be the round trip delay on the link connecting the host machine and the accelerator and is similar for different types of cross system calls, thus $\forall i$, $\Delta_i \approx \Delta$. Processor overhead on each server is dominated by CPU cycles consumed to make a remote call procedure (RCP) call and is similar for different types of cross system calls, thus $\forall i$, $\alpha_i \approx \alpha$, $\beta_i \approx \beta$. Under these approximations, with $N(=\Sigma_i n_i)$ being the total number of cross system calls between the host and the accelerator in HA-mode, we have $\delta_{h-a}^{HA} = \Delta N$, $A = \alpha N$, $B = \beta N$.

In one embodiment of the present disclosure, during Phase-I, H-mode workload data is used to infer the service times on the servers ($S_h^H$, $S_d^H$) and the communication delay between the servers ($\delta_{h-d}^H$). Also during Phase I, HA-mode workload data is used to infer the service times on the servers ($S_h^{HA}$, $S_d^{HA}$, $S_a^{HA}$) and the communication delays between the servers ($\delta_{h-d}^{HA}$, $\delta_{h-a}^{HA}$). Then from the service times in H-mode and HA-mode, γ is calculated as in equation (1). In Phase 1, from workload profiling, total number of cross system calls is known and hence the per cross system aggregate CPU overhead, i.e., α+β can be calculated as:

$$\alpha + \beta = \frac{\gamma}{N}.$$

Knowing $\delta_{h-a}^{HA}$, per cross system call communication delay between the host and the accelerator can be calculated as:

$$\Delta = \frac{\delta_{h-a}^{HA}}{N}.$$

Different models can be used to find the decomposition of aggregate CPU overhead per cross system call into α and β. For an example model that attributes all of the CPU overhead to the host, we have α=γ/N, β=0 whereas for another model that attributes all of the CPU overhead to the accelerator we have α=0, β=γ/N. Thus, at end of Phase-1, we have α, β and Δ.

After the learning phase (Phase I), in Phase II, the methodology of the present disclosure in one embodiment uses the host only measurement to get the profile of the new workload and the CPU time consumption on the host in the host-only mode. Then using the communication cost and CPU cost estimates from Phase I, the methodology of the present disclosure in one embodiment predicts the acceleration potential for this workload.

In Phase II, for the candidate workload, say w, whose performance in accelerated environment is to be predicted, we first infer the service time on servers ($S_{h,w}^H$, $S_{d,w}^H$) using measurements in H-mode. Using workload profiling tools, we obtain characteristics of all those calls that are candidate for offloading to accelerator in HA-mode. In particular we get the aggregate count of such calls, $N_w$ and the fraction of CPU cycles that can be offloaded to accelerator in HA-mode for this workload, i.e., $OP_w$. From workload profiling we estimate the CPU cycles consumed by these $N_w$ calls on the host. Let this be denoted by $CPU\_N_w$. Then we can write:

$$OP_w = \frac{CPU\_N_w}{S_{h,w}^H}.$$

Using α, β and Δ from Phase 1 and $N_w$ we calculate $$\delta_{h-a,w}^{HA} = \Delta N_w,$$

$$A_w = \alpha N_w,$$

$$B_w = \beta N_w.$$

Having estimates of $OP_w$, $S_{h,w}^H$, $A_w$ and $B_w$ using Equation (3) the service times on servers in HA-mode for this workload is estimated as:

$$S_{h,w}^{HA} = \left(1 - \frac{OP_w}{100}\right) * S_{h,w}^H + A_w,$$

$$S_{a,w}^{HA} = \frac{OP}{100} * S_{h,w}^H + B_w.$$

Knowing estimates of $S_{h,w}^{HA}$, $S_{a,w}^{HA}$ and $\delta_{h-a,w}^{H}$, the performance of the workload in HA-mode can be predicted. In particular, the response time can be calculated using equation in FIG. 6C and throughput using equation in FIG. 6D. Also different acceleration related performance metrics like CPU_OHD and CPU_SAV as defined earlier can be calculated.

Figure 7:
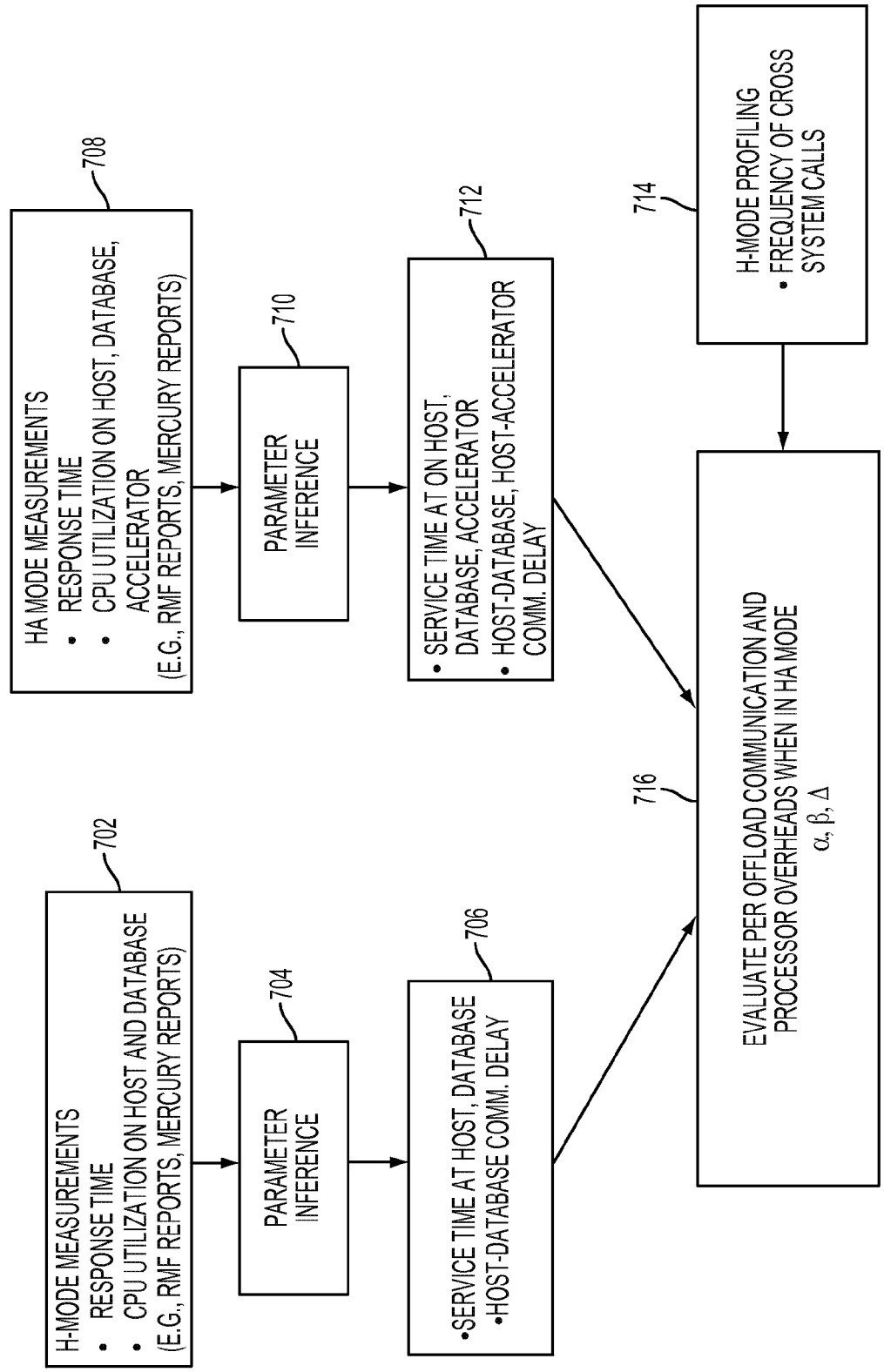
FIG. 7 is a flow diagram illustrating a method of model building in one embodiment of the present disclosure.

FIG. 7 is a flow diagram illustrating a method of model building in one embodiment of the present disclosure. At 702, host only mode measurements are obtained. Examples of measurements may include response time, CPU utilization (e.g., CPU cycle usage) on a host machine and/or one or more other components, e.g., database. Measurements may also include transaction throughput. Such measurements may be obtained, e.g., via report generators such as Resource Management Facility (RMF) reports and Mercury reports. Briefly, RMF is a standard performance monitoring and data gathering tool on z/OS.

At 704, parameter inference is performed. Using H-mode measurements and parametric system model, unknown system parameters are inferred and the model is calibrated. Different inference techniques can be applied to infer the service times at servers and communication delay between the servers including non-linear optimization to find the parameters that best fit the measurement data. For instance, one or more of inference techniques described in L. Zhang, C. H. Xia, M. S. Squillante, and III Mills, W. N. Workload service requirements analysis: a queuing network optimization approach, In Modeling Analysis and Simulation of Computer and Telecommunications Systems, MASCOTS 2002 Proceedings 10th IEEE International Symposium, pages 23-32, 2002; and Z. Liu, C. H. Xia, P. Momcilovic, and L. Zhang, AMBIENCE: Automatic Model Building using Inference, In Congress MSR03, Metz, France, October 2003 may be utilized.

At 706, service time (e.g., CPU cycles) at host machine and, e.g., database is obtained and communication delay in the host machine, e.g., between the host machine and database is computed as a result of the inferencing performed at 704. The service time (e.g., CPU cycles) refers to the total time a job consumes.

Similarly at 708, host and accelerator mode measurements are obtained. Examples of measurements may include response time, CPU utilization (e.g., CPU cycle usage) on a host machine and/or one or more other components, e.g., database, CPU utilization on one or more accelerators. Measurements may also include transaction throughput. Such measurements may be obtained, e.g., via report generators such as RMF reports and Mercury reports.

At 710, parameter inference is performed. For instance, a non-linear optimization technique may be applied to infer values at 712.

At 712, service time at host machine, e.g., database, and one or more accelerators is obtained and communication delay between the host and database, and between the host and one or more accelerators are computed as a result of the inferencing performed at 710.

At 714, frequency of cross system calls is determined in host only mode profiling, and input to an evaluation performed at 716. The host only mode profiling is carried out to determine the number of cross system calls and possibly their histogram distribution based on their types.

At 716, per offload communication (e.g., per system call) and processor overheads when in host-accelerator mode are computed based on the inputs 706, 712 and 714. The communication delay between host and accelerator per cross system call may be determined or estimated. Processor overhead on both the host and the accelerator to make a cross system call is also determined. For instance, alpha ($\alpha$) represents CPU overhead of a cross system call (e.g., a cross system call of type i) on the host machine, beta ($\beta$) represents CPU overhead of the cross system call on the accelerator, and Delta ($\Delta$) represents a two-way communication delay incurred by the cross system call.

Figure 8:
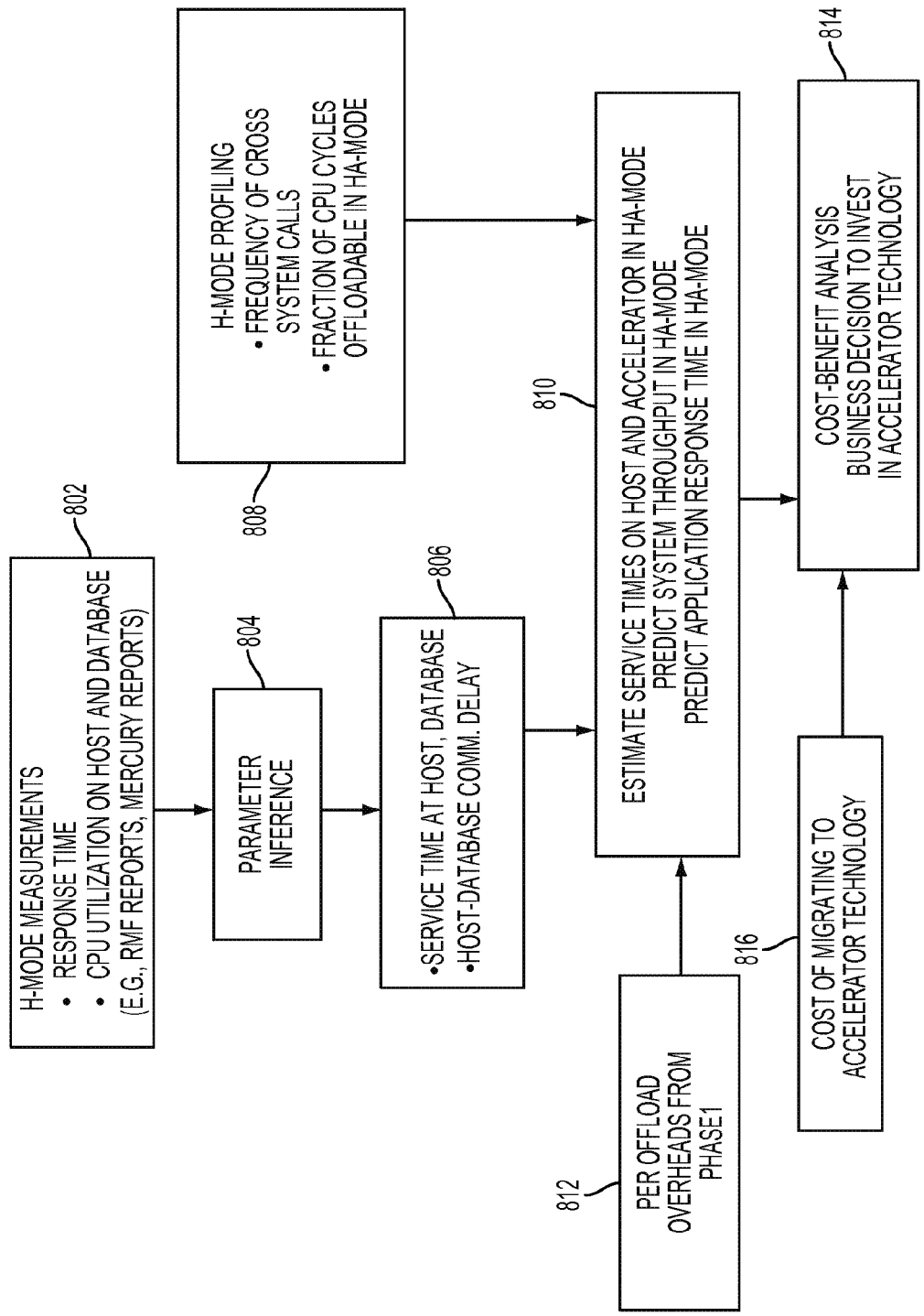
FIG. 8 is a flow diagram illustrating a method of predicting in one embodiment of the present disclosure.

FIG. 8 is a flow diagram illustrating a method of predicting in one embodiment of the present disclosure. This phase involves measurement based determination of service time (e.g., CPU cycles) of workload transactions at servers involved in host-only mode. At 802, host only mode measurements are obtained, e.g., response time and CPU utilization on host and, e.g., another component such as database. At 804, parameter inference is performed and at 806, service time at host and database, and communication delay between the host and the database is obtained.

At 808, host only mode profiling is performed to determine frequency of cross system calls (and possibly their distribution) and fraction of CPU cycles offloadable in host-accelerator mode.

At 810, based on the host only mode profiling at 808, and per offload overheads modeled from phase one 812 (e.g., FIG. 7, 716), service times are estimated, system throughput is predicted and application response time is predicted in host-accelerator mode. For instance, the estimated potential cross system calls for this workload profiled or computed at 808, communication and CPU cost per cross system call 812 determined in FIG. 7 at 716, are used to determine the communication and CPU cost for this workload when it will run in host-accelerator environment. The host service time in host-only mode for this workload 806, estimated potential CPU cycles offloadable in host-accelerator mode 808, and the determined communication and CPU overhead cost when it will run in host-accelerator environment, are used to predict end-to-end application (workload) response time in host-accelerator mode (environment). System throughput in host-accelerator mode may be also predicted. The end-to-end application response time may be computed using the formula shown in FIG. 6C in one embodiment of the present disclosure. The system throughput may be computed using the formula shown in FIG. 6D in one embodiment of the present disclosure.

At 814, cost-benefit analysis may be performed based on the estimates and prediction determined at 810 and cost of migrating to accelerator technology at 816.

Figure 9:
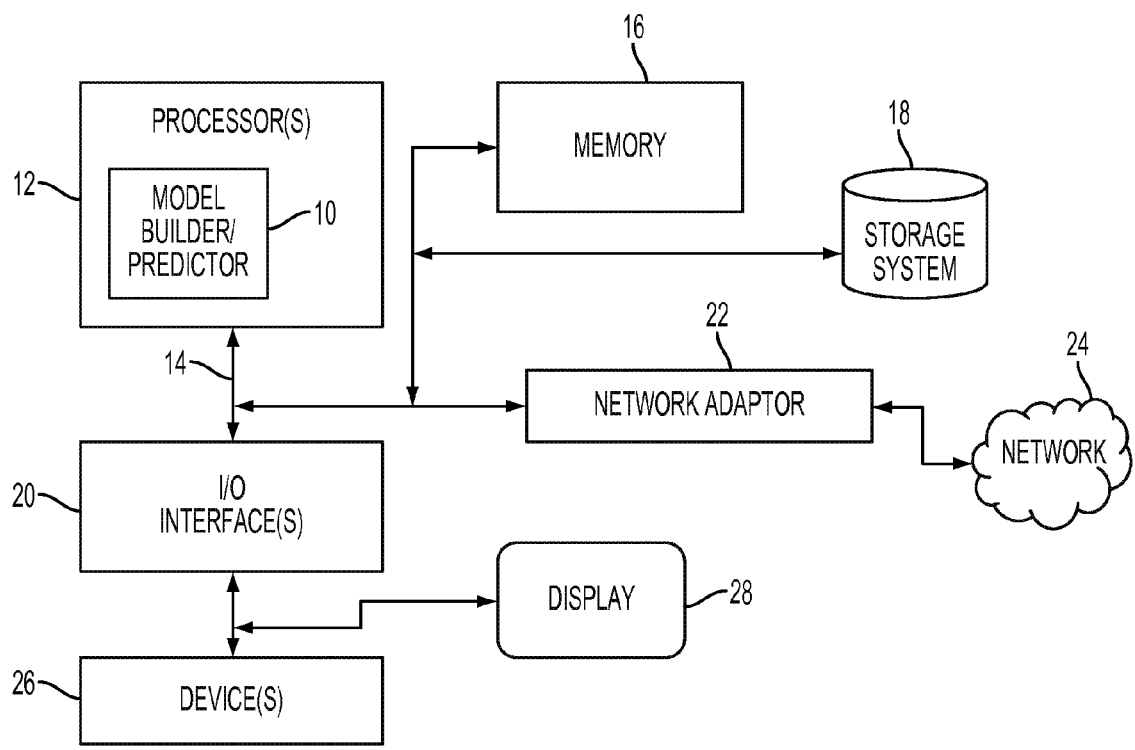
FIG. 9 illustrates a schematic of an example computer or processing system that may implement a system in one embodiment of the present disclosure.

FIG. 9 illustrates a schematic of an example computer or processing system that may implement the model building/prediction system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a model builder/predictor module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory computer readable storage medium storing a program of instructions executable by a machine to perform a method of predicting acceleration in a hybrid system, the method comprising:

receiving response time and central processing unit (CPU) utilization measurements in first host-only computer architecture running a workload;

performing parameter inferencing on the response time and CPU utilization measurements of the first host-only computer architecture running a workload;

determining service time of a host machine in the first host-only computer architecture running the workload based on the parameter inferencing of the response time and CPU utilization measurements of the host-only computer architecture running a workload;

receiving response time and CPU utilization measurements in first host-accelerator computer architecture running the workload;

performing parameter inferencing on the response time and CPU utilization measurements of the first host-accelerator computer architecture running the workload;

determining service time of a host machine in the first host-accelerator computer architecture running the workload based on the parameter inferencing of the response time and CPU utilization measurements of the first host-accelerator computer architecture running the workload;

determining service time of an accelerator in the first host-accelerator computer architecture running the workload based on the parameter inferencing of the response time and CPU utilization measurements of the first host-accelerator computer architecture running the workload;

determining aggregate communication delay between the host machine and the accelerator in the first host-accelerator computer architecture running the workload;

determining a number of cross system calls in the first host-accelerator computer architecture running the workload;

determining a communication delay associated with each of the cross system calls based on at least the aggregate communication delay between the host machine and the accelerator in the first host-accelerator computer architecture running the workload, and the number of cross system calls in the first host-accelerator computer architecture running the workload;

determining host machine overhead and accelerator overhead in the first host-accelerator computer architecture associated with each of the cross system calls based at least on the service time of a host machine in the first host-only computer architecture running the workload, the service time of a host machine in the first host-accelerator computer architecture running the workload, the service time of an accelerator in the first host-accelerator computer architecture running the workload, and the number of cross system calls in the first host-accelerator computer architecture running the workload; and predicting an application response time for a candidate application to be run in a second host-accelerator computer architecture, based at least on the determined host machine overhead, the accelerator overhead, and the communication delay associated with each of the cross system calls.

2. The computer readable storage medium of claim 1, wherein the predicting an application response time for a candidate application to be run in a second host-accelerator computer architecture comprises:

determining service time of a host machine in a second host-only computer architecture running the application;

determining a number of potential cross system calls associated with the candidate application;

determining a fraction of processor cycles offloadable in the second host-accelerator computer architecture;

estimating service time of a host machine in the second host-accelerator computer architecture for running the candidate application and service time of an accelerator in the second host-accelerator computer architecture for running the candidate application, based on at least the number of potential cross system calls associated with the candidate application, the fraction of processor cycles offloadable in the second host-accelerator computer architecture, the service time of a host machine in a second host-only computer architecture running the application, the host machine overhead and the accelerator overhead in the first host-accelerator computer architecture associated with each of the cross system calls; and predicting the application response time based at least on the estimated service time of a host machine in the second host-accelerator computer architecture for running the candidate application, the estimated service time of an accelerator in the second host-accelerator computer architecture for running the candidate application, and the communication delay associated with each of the cross system calls.

3. The computer readable storage medium of claim 2, further comprising predicting system throughput for the candidate application for running in the second host-accelerator computer architecture, based on at least the estimated service time of a host machine in the second host-accelerator computer architecture for running the candidate application and the estimated service time of an accelerator in the second host-accelerator computer architecture for running the candidate application.

4. The computer readable storage medium of claim 3, further comprising performing a cost-benefit analysis based on the predicted application response time and the predicted system throughput, and a cost of migrating to the second host-accelerator computer architecture.

5. The computer readable storage medium of claim 2, wherein the service time of a host machine in a second host-only computer architecture running the application is determined based on parameter inferencing performed on system measurements of the second host-only computer architecture.

6. A system for predicting acceleration in a hybrid system, comprising:

a computer processor;

a model building module operable to execute on the computer processor and further operable to determine a number of cross system calls in a first host-accelerator computer architecture running a workload, the model building module further operable to determine host machine overhead and accelerator overhead in the first host-accelerator computer architecture associated with each of the cross system calls based on at least service time of a host machine in a first host-only computer architecture running the workload, service time of a host machine in the first host-accelerator computer architecture running the workload, service time of an accelerator in the first host-accelerator computer architecture running the workload based, and the number of cross system calls in a first host-accelerator computer architecture running a workload, the model building module further operable to determine communication delay associated with each of the cross system calls in the first host-accelerator computer architecture running a workload; and an acceleration prediction module operable to predict an application response time for a candidate application to be run in a second host-accelerator computer architecture, based at least on the determined host machine overhead, the accelerator overhead, and the communication delay associated with each of the cross system calls in the first host-accelerator computer architecture running a workload, wherein the model building module is operable to determine service time of the host machine in the first host-only computer architecture running the workload based on parameter inferencing of response time and central processing unit (CPU) utilization measurements of the host-only computer architecture running a workload, the model building module is further operable to determine service time of the host machine in the first host-accelerator computer architecture running the workload based on parameter inferencing of response time and CPU utilization measurements of the first host-accelerator computer architecture running the workload, and the model building module is further operable to determine service time of the accelerator in the first host-accelerator computer architecture running the workload based on the parameter inferencing of the response time and CPU utilization measurements of the first host-accelerator computer architecture running the workload, to determine the host machine overhead and accelerator overhead in the first host-accelerator computer architecture.

7. A system for predicting acceleration in a hybrid system, comprising:

a computer processor;

a model building module operable to execute on the computer processor and further operable to determine a number of cross system calls in a first host-accelerator computer architecture running a workload, the model building module further operable to determine host machine overhead and accelerator overhead in the first host-accelerator computer architecture associated with each of the cross system calls based on at least service time of a host machine in a first host-only computer architecture running the workload, service time of a host machine in the first host-accelerator computer architecture running the workload, service time of an accelerator in the first host-accelerator computer architecture running the workload, and the number of cross system calls in a first host-accelerator computer architecture running a workload, the model building module further operable to determine communication delay associated with each of the cross system calls in the first host-accelerator computer architecture running a workload based on parameter inferencing using response time and central processing unit (CPU) utilization measurement of the first host-accelerator computer architecture running the workload; and an acceleration prediction module operable to predict an application response time for a candidate application to be run in a second host-accelerator computer architecture, based at least on the determined host machine overhead, the accelerator overhead, and the communication delay associated with each of the cross system calls in the first host-accelerator computer architecture running a workload.

8. The system of claim 7, wherein the acceleration prediction module is operable to determine service time of a host machine in a second host-only computer architecture running the application, the acceleration prediction module is further operable to determine a number of potential cross system calls associated with the candidate application, the acceleration prediction module is further operable to determine a fraction of processor cycles offloadable in the second host-accelerator computer architecture, the acceleration prediction module is further operable to estimate service time of a host machine in the second host-accelerator computer architecture for running the candidate application and service time of an accelerator in the second host-accelerator computer architecture for running the candidate application, based on at least the number of potential cross system calls associated with the candidate application, the fraction of processor cycles offloadable in the second host-accelerator computer architecture, the service time of a host machine in a second host-only computer architecture running the application, the host machine overhead and the accelerator overhead in the first host-accelerator computer architecture associated with each of the cross system calls, and the acceleration prediction module is further operable to predict the application response time based at least on the estimated service time of a host machine in the second host-accelerator computer architecture for running the candidate application, the estimated service time of an accelerator in the second host-accelerator computer architecture for running the candidate application, and the communication delay associated with each of the cross system calls.

9. The system of claim 7, wherein the acceleration prediction module is further operable to predict system throughput for the candidate application for running in the second host-accelerator computer architecture, based on at least the estimated service time of a host machine in the second host-accelerator computer architecture for running the candidate application and the estimated service time of an accelerator in the second host-accelerator computer architecture for running the candidate application.

10. The system of claim 9, wherein the service time of a host machine in a second host-only computer architecture running the application is determined based on parameter inferencing performed on system measurements of the second host-only computer architecture.

11. The system of claim 10, wherein a cost-benefit analysis is performed based on the predicted application response time and the predicted system throughput, and a cost of migrating to the second host-accelerator computer architecture.

* * * * *